US006813122B1

(12) United States Patent
Granstrom

(10) Patent No.: US 6,813,122 B1
(45) Date of Patent: Nov. 2, 2004

(54) MEMS-BASED ESD PROTECTION OF MAGNETIC RECORDING HEADS

(75) Inventor: Eric Leroy Granstrom, Golden Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 156 days.

(21) Appl. No.: 10/348,398

(22) Filed: Jan. 21, 2003

Related U.S. Application Data

(60) Provisional application No. 60/362,508, filed on Mar. 6, 2002.

(51) Int. Cl.[7] .............................. G11B 5/39; G11B 5/40
(52) U.S. Cl. ....................................... 360/323; 360/128
(58) Field of Search ........................ 360/97.02, 97.03, 360/323, 128

(56) References Cited

U.S. PATENT DOCUMENTS

| | | | |
|---|---|---|---|
| 5,465,186 A | 11/1995 | Bajorek et al. ............. 360/113 |
| 5,699,212 A | 12/1997 | Erpelding et al. .......... 360/104 |
| 5,710,682 A | 1/1998 | Arya et al. ................. 360/106 |
| 5,757,590 A | 5/1998 | Phipps et al. ............... 360/113 |
| 5,877,933 A | 3/1999 | Johansen et al. ........... 361/220 |
| 5,946,176 A | 8/1999 | Ghoshal ..................... 361/56 |
| 6,239,685 B1 | 5/2001 | Albrecht et al. ............ 337/365 |
| 6,239,947 B1 | 5/2001 | Fan et al. ................... 360/104 |
| 6,262,868 B1 | 7/2001 | Arya et al. ................. 360/290 |
| 6,275,361 B1 | 8/2001 | Wallash et al. ............. 360/323 |
| 6,504,447 B1 * | 1/2003 | Laney et al. ................ 333/17.2 |
| 6,507,466 B1 * | 1/2003 | Hayashi et al. ............. 360/323 |
| 6,507,467 B1 * | 1/2003 | Schadewald et al. ....... 360/323 |
| 6,538,857 B1 * | 3/2003 | Doss et al. ................. 360/323 |
| 6,552,879 B2 * | 4/2003 | Voldman .................... 360/323 |
| 6,574,078 B1 * | 6/2003 | Voldman .................... 360/323 |
| 2002/0060888 A1 * | 5/2002 | Kanda ........................ 360/323 |
| 2002/0075610 A1 * | 6/2002 | Schadewald et al. ....... 360/323 |

* cited by examiner

Primary Examiner—Jefferson Evans
(74) Attorney, Agent, or Firm—Kinney & Lange, P.A.

(57) ABSTRACT

A magnetic recording head system is protected against electrostatic discharge (ESD) and electrical overstress (EOS). The system includes a transducing read element and a drive circuit for connection to operate the transducing read element. A microelectromechanical switch has an input to receive an electrical control signal that selectively switches between a first state for protecting the transducing read element and a second state for operating the transducing read element.

20 Claims, 6 Drawing Sheets

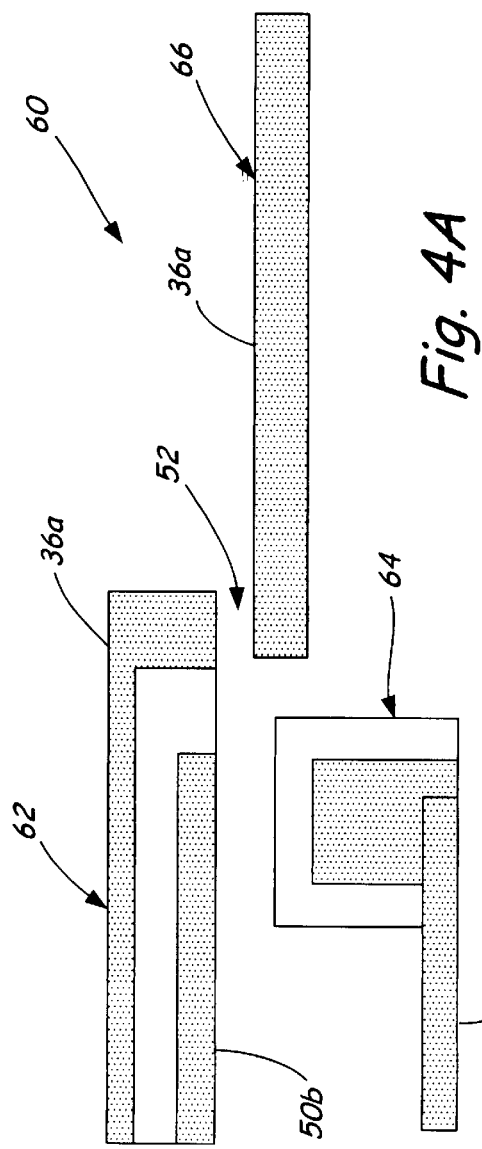
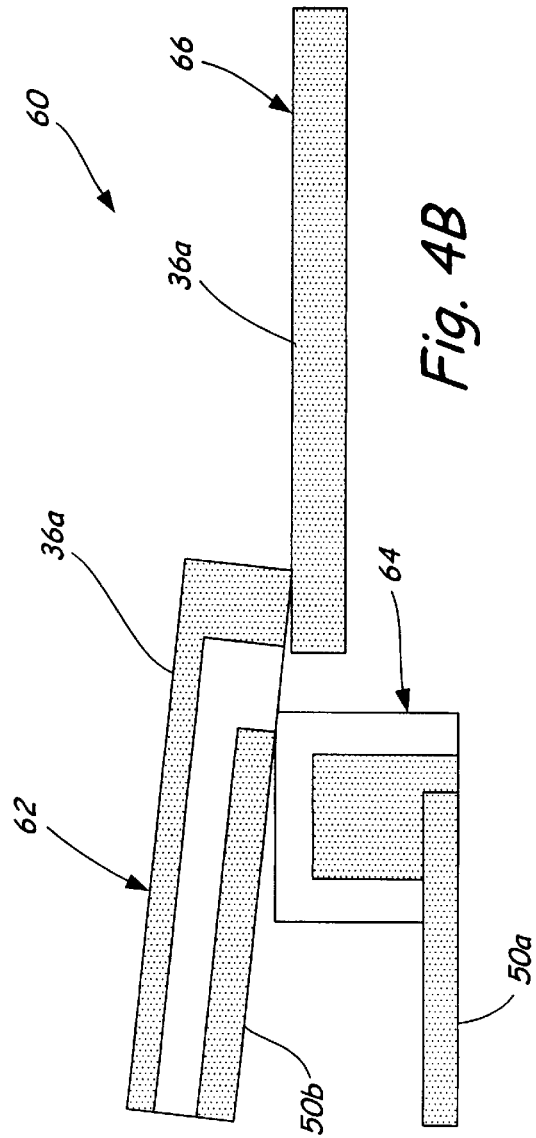

US 6,813,122 B1

MEMS-BASED ESD PROTECTION OF MAGNETIC RECORDING HEADS

CROSS-REFERENCE TO RELATED APPLICATION(S)

This application claims the benefit of Provisional Application No. 60/362,508 filed Mar. 6, 2002 for "MEMS-based ESD protection of magnetic recording head" by E. Granstrom.

INCORPORATION BY REFERENCE

The aforementioned Provisional Application No. 60/362,508 is hereby incorporated by reference in its entirety.

BACKGROUND OF THE INVENTION

The present invention relates to protection of magnetic recording heads from electrostatic discharge (ESD), and more particularly to a microelectromechanical system (MEMS) for controllably shunting a recording head away from its driving circuit and/or electrical contacts during periods of non-operation.

Magnetic recording heads possess an acute sensitivity to damage or failure from ESD or electrical overstress (EOS) events, both during disc drive production and after assembly of the drive. During production, it is possible to electrically disconnect the recording head from the other electronic components of the drive, thereby offering protection against damage from ESD or EOS. Alternatively, systems have been proposed in which simple mechanical clamps are added to a disc drive during production to provide a shunt from reader elements of the recording head to each other or to ground to provide ESD protection. However, both of these systems tend to add expense to production of the drive, perhaps even greater than the benefit they provide, due to the addition of separate physical elements to the recording head and the requirement to enable and disable during different stages of production and use of the drive. Furthermore, such proposed systems are temporary and need to be removed or permanently disabled prior to final assembly.

Improvements are needed in the art of ESD protection for magnetic recording heads, which is the subject of the present invention.

BRIEF SUMMARY OF THE INVENTION

The present invention is a magnetic recording head system that is protected against electrostatic discharge (ESD) and electrical overstress (EOS). The system includes a transducing read element and a drive circuit for connection to operate the transducing read element. A microelectromechanical switch has an input to receive an electrical control signal that selectively switches between a first state for protecting the transducing read element and a second state for operating the transducing read element.

BRIEF DESCRIPTION OF THE DRAWINGS

FIGS. 4A and 4B are diagrams illustrating the operation of a MEMS-based ESD protection switch in accordance with the present invention.

DETAILED DESCRIPTION

Figure 1:
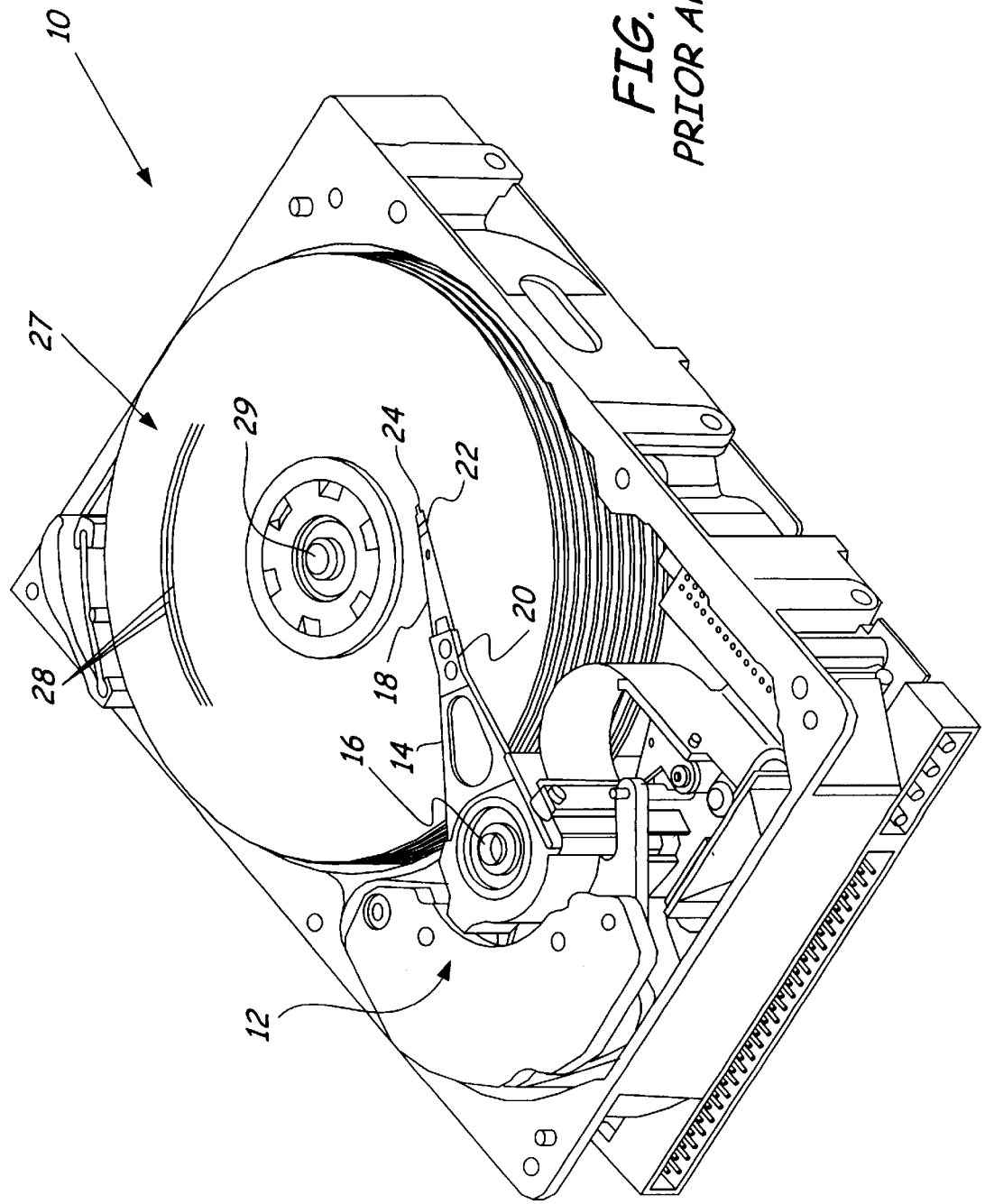
FIG. 1 is a perspective view of a typical, exemplary disc drive.

FIG. 1 is a perspective view of typical, exemplary disc drive 10. Disc drive 10 includes voice coil motor (VCM) 12 arranged to rotate actuator arm 14 on a spindle around axis 16. Head suspension 18 is connected to actuator arm 14 at head mounting block 20. Flexure 22 is connected to an end of head suspension 18, and carries slider 24. Slider 24 carries a transducing head (not shown in FIG. 1) over disc 27, for reading and/or writing data on concentric tracks 28 of disc 27. Disc 27 rotates around axis 29, so that windage is encountered by slider 24 to keep it aloft a small distance above the surface of disc 27.

Figure 2:
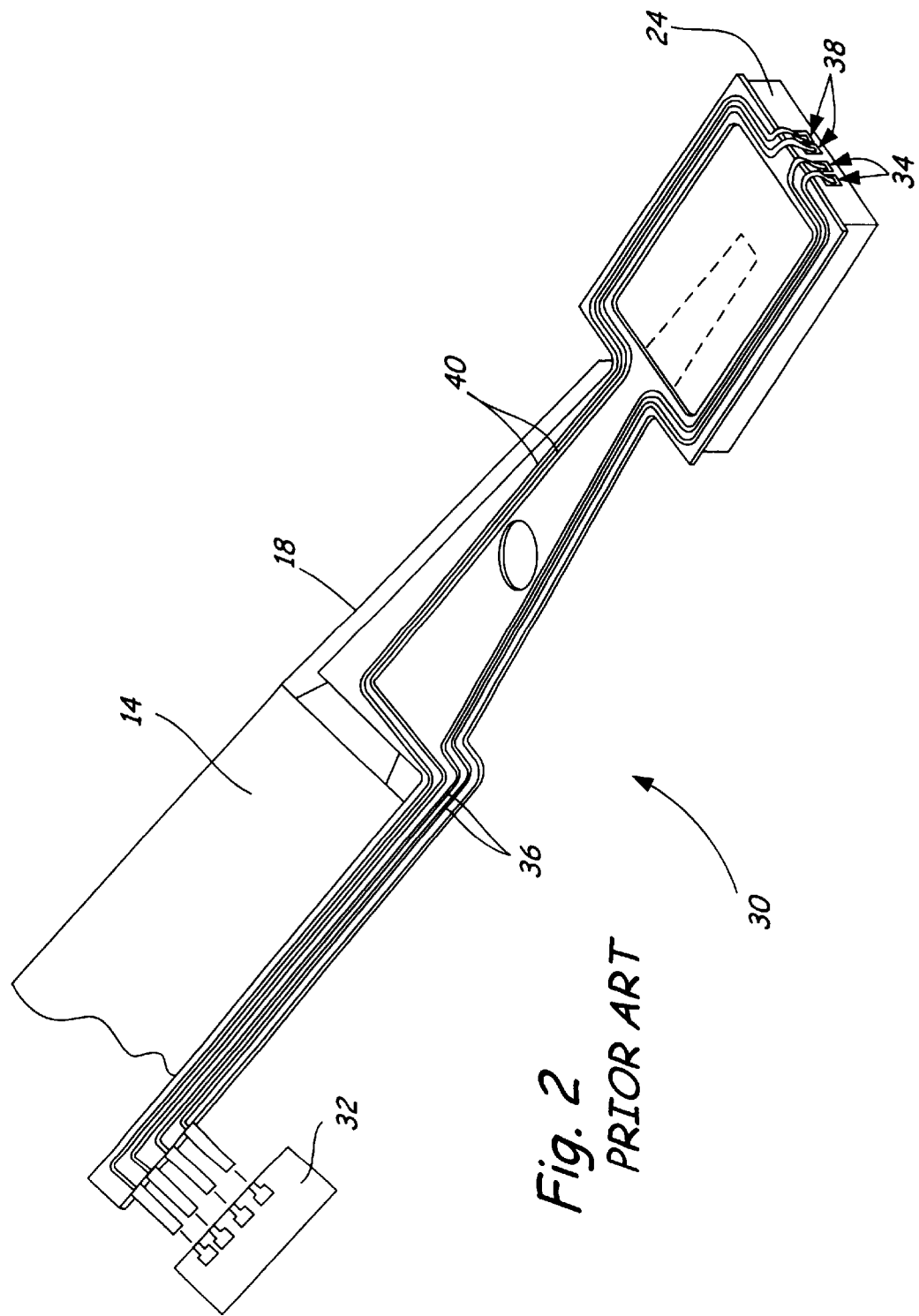
FIG. 2 is a perspective view of a portion of a disc drive illustrating a typical, exemplary configuration of a head interconnection circuit for electrically connecting a drive circuit to a transducing read/write head.

FIG. 2 is a perspective view of a portion of disc drive 10 illustrating a typical, exemplary configuration of head interconnection circuit 30 for electrically connecting drive circuit 32 to a transducing read/write head. Interconnect circuit 30 connects drive circuit 32 to read head leads 34 via conductive leads 36, and connects drive circuit 32 to write head leads 38 via conductive leads 40. It will be understood by those skilled in the art that other configurations of the components of disc drive 10 and interconnect 30 may also be used, and that the ESD protection scheme of the present invention has application to all such configurations.

While a disc drive (such as disc drive 10) is being produced and assembled, the transducing read head is vulnerable to damage caused by ESD. This vulnerability can be reduced by either electrically disconnecting the head from its associated drive circuitry or by providing a low resistance electrical path (shunt) in parallel to the transducer during these stages of disc drive production. The head can be protected by disconnecting one or more of the head leads or by connecting the head leads together or to ground, for example. However, during electrical testing and during operation of the disc drive, the head must be connected back to the drive circuitry and be without any shunts remaining in the circuit path. In the past, this has meant manually adding and removing a mechanical clamp or operating a mechanical switch, which adds labor costs to the process of assembling and testing a disc drive. The present invention provides a MEMS-based switch or shunt to allow the head to be selectively connected and disconnected, or alternatively shunted and deshunted, from the drive circuitry in response to an electrical control signal.

Figure 3:
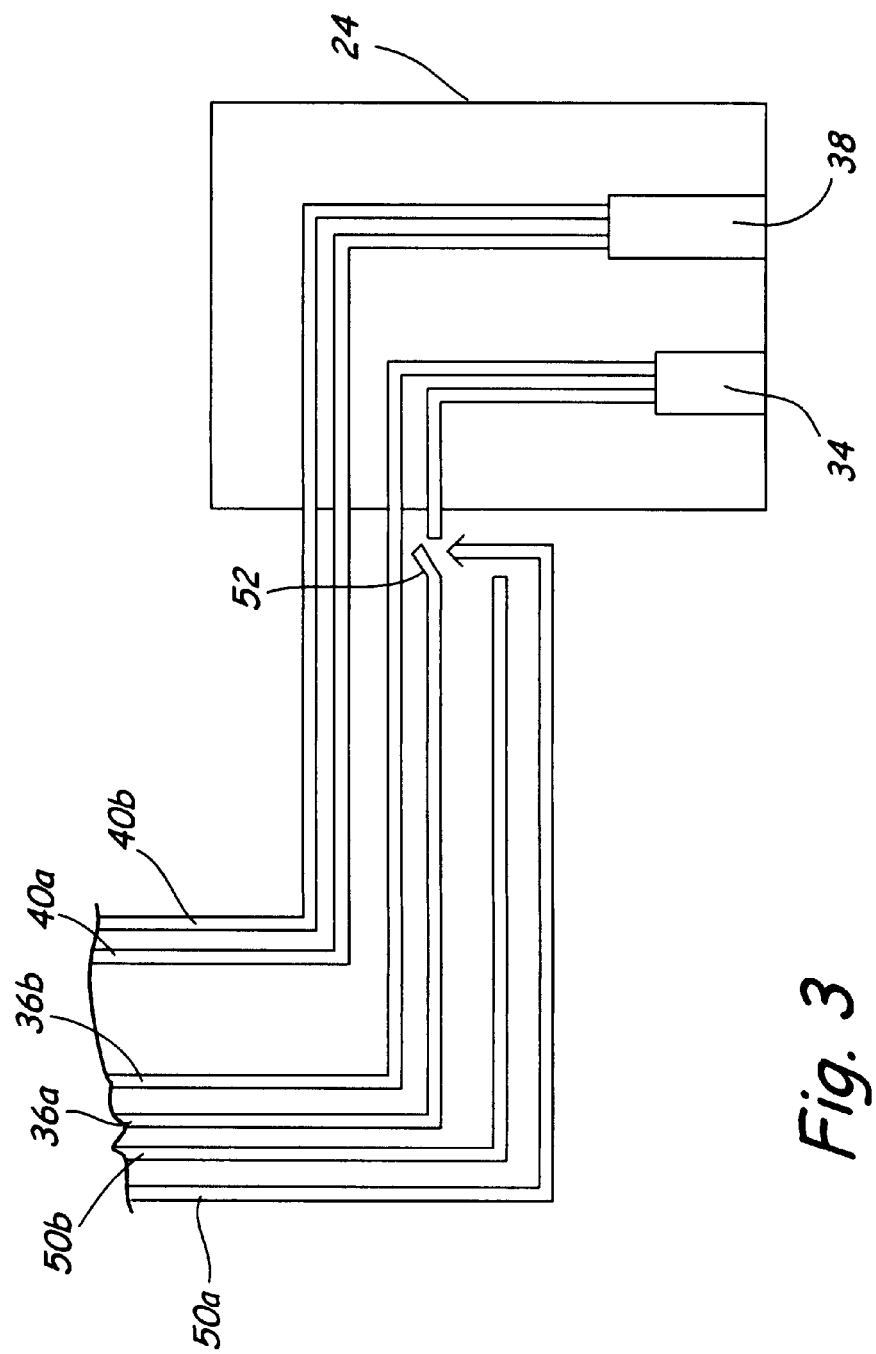
FIG. 3 is a diagram illustrating the switched ESD protection provided by the present invention.

FIG. 3 is a diagram illustrating an ESD protection switch provided by the present invention. Leads 36a and 36b connect read head 34 to drive circuit 32 (FIG. 2), and leads 40a and 40b connected write head 38 to drive circuit 32 (FIG. 2). A controllable ESD protection switch is controlled by input control signals on leads 50a and 50b, and is operable to disconnect read head 34 from its associated drive circuit by creating interrupt 52 in lead 36a. It should be understood by those skilled in the art that the depiction of interrupt 52 in FIG. 3 is schematic in nature, and is a simplified illustration of an actual implementation of the controllable switch.

FIGS. 4A and 4B are diagrams illustrating the operation of exemplary MEMS-based ESD protection switch 60 in accordance with an embodiment of the present invention. Control signals are carried on leads 50a and 50b to cause structure 62 to either separate from structure 64 (FIG. 4A)

or to contact structure 64 (FIG. 4B). In the separated position (FIG. 4A), structure 62 is separated from structure 66, leaving lead 36a separated at interruption 52. In the contacted position, structure 62 contacts structure 66 so that lead 36a provides a continuous conductive path for the read head to be connected its associated drive circuit.

Exemplary switch 60 is configured as a MEMS, constructed according to MEMS fabrication techniques generally known in the art of an appropriate MEMS material. As such, switch 60 is capable of being formed with extremely small size and high resolution, controllable by an electrical signal in order to achieve mechanical movement. In an exemplary embodiment, structures 62 and 64 are separated in an unenergized (passive) state, and actuated to contact one another in an energized (active) state. Other configurations of a MEMS-based switch may also be employed within the scope of the present invention.

Figure 5:
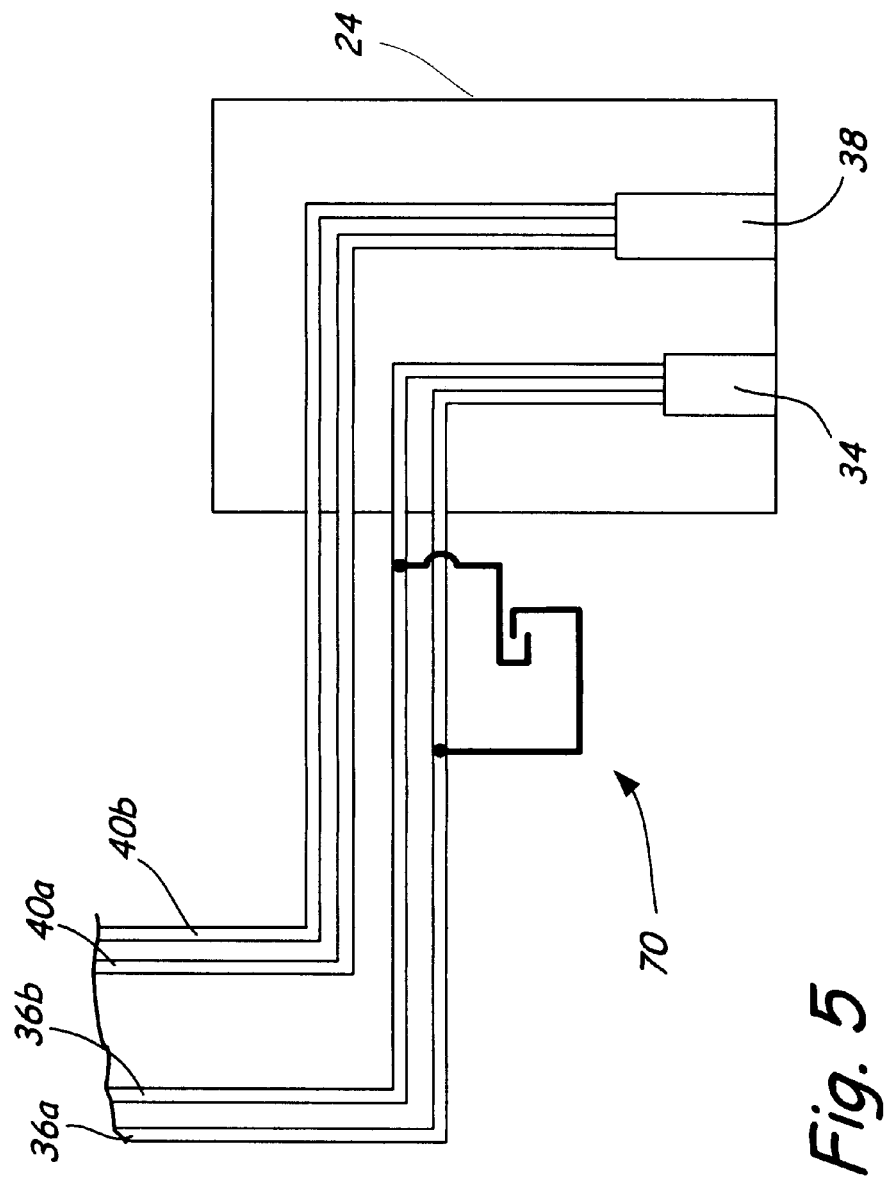
FIG. 5 is a diagram schematically illustrating an ESD protection shunt in accordance with the present invention.

FIG. 5 is a diagram schematically illustrating ESD protection shunt 70 in accordance with the present invention. Leads 36a and 36b connect read head 34 to drive circuit 32 (FIG. 2), and leads 40a and 40b connected write head 38 to drive circuit 32 (FIG. 2). Controllable ESD protection shunt 70 is controlled by input control signals (not shown in FIG. 5 for the sake of simplicity), and is operable to connect leads 36a and 36b together in order to isolate read head 34 from drive circuit 32 (FIG. 2) for protection from ESD. It should be understood by those skilled in the art that the depiction of shunt 70 in FIG. 5 is schematic in nature, and is a simplified illustration of an actual implementation of the controllable shunt.

Figure 6B:
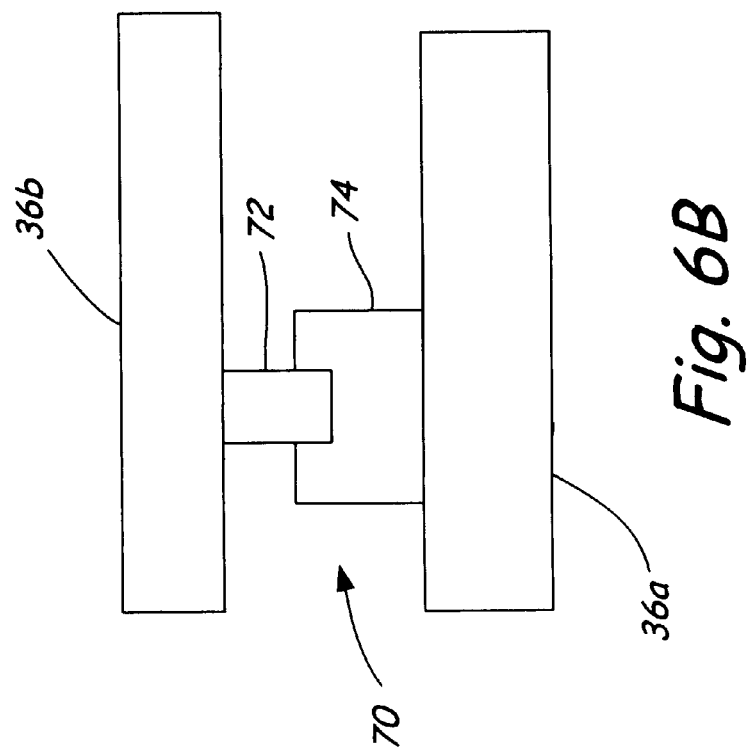
FIGS. 6A and 6B are diagrams illustrating the operation of a MEMS-based ESD protection shunt in accordance with the present invention.
Figure 6A:
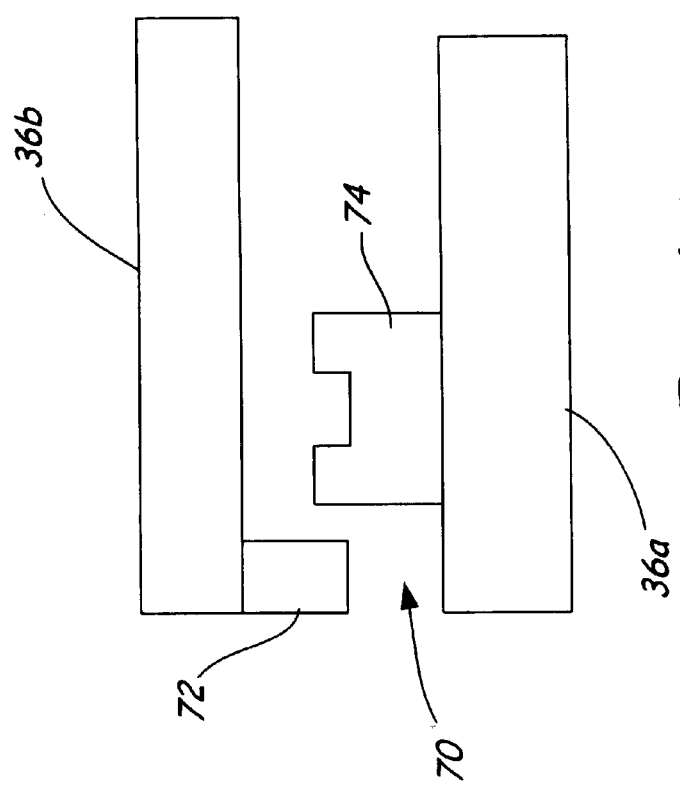

FIGS. 6A and 6B are diagrams illustrating the operation of exemplary MEMS-based ESD protection shunt 70 in accordance with an embodiment of the present invention. Lead 36b is connected to conductive structure 72, and lead 36a is connected to conductive structure 74. In an operative (non-ESD protected) state, shown in FIG. 6A, leads 36a and 36b are not connected together. This allows signals to be passed along leads 36a and 36b between the read head and drive circuitry in a normal manner for operation of the disc drive. In a shunted (ESD protected) state, shown in FIG. 6B, leads 36a and 36b are connected together through mated conductive structures 72 and 74. This prevents signals from being passed along leads 36a and 36b between the read head and drive circuitry, effectively disconnecting the read head from the drive circuitry and providing protection against damage caused by ESD.

Exemplary shunt 70 is configured as a MEMS, constructed according to MEMS fabrication techniques generally known in the art of an appropriate MEMS material. As such, shunt 70 is capable of being formed with extremely small size and high resolution, controllable by an electrical signal in order to achieve mechanical movement. In an exemplary embodiment, structures 72 and 74 are connected together in an unenergized (passive) state, and actuated to pull apart from one another in an energized (active) state. Also, it is contemplated in an alternative embodiment that shunt 70 may connect one of leads 36a and 36b to ground or another fixed potential rather than to one another in order to provide ESD protection. Other configurations of a MEMS-based shunt may also be employed within the scope of the present invention.

In another embodiment, a large bleed resistor is connected between read head 34 and ground, in addition to shunt 70, offering further ESD protection. The bleed resistor equalizes the potentials between read head 34 and any connected circuit element (such as a testing tool, for example) so that ESD events are prevented. When it is desired for read head 34 to operate, a MEMS-based structure is actuated to contact the appropriate reader leads 36a and 36b to provide the necessary low resistance signal path.

The present invention provides a MEMS-based switching mechanism for selectively disconnecting a read head from its associated drive circuitry or shunting the read head's leads to each other or to a fixed potential in response to an input control signal. The disconnection or shunting of the read head provides protection against ESD, which is particularly desirable during the production and assembly stages of disc drive manufacture. The MEMS-based design allows the ESD protection device to be implemented in the disc drive as a permanent part, controllable by an electrical signal, rather than requiring manual removal from the disc drive once assembly is complete. The MEMS configuration of the present invention is particularly beneficial for disc drives employing a MEMS microactuator in order to improve the achievable resolution of head positioning. In such a disc drive, the MEMS-based ESD protection of the present invention can be readily incorporated into the design of the microactuator, without adding significant expense.

Although the present invention has been described with reference to preferred embodiments, workers skilled in the art will recognize that changes may be made in form and detail without departing from the spirit and scope of the invention.

What is claimed is:

1. A magnetic recording head system having protection against electrostatic discharge (ESD) and electrical overstress (EOS), comprising:
   a transducing read element;
   a drive circuit for connection to operate the transducing read element; and
   a microelectromechanical switch having an input to receive an electrical control signal that selectively switches between a first state for protecting the transducing read element and a second state for operating the transducing read element.

2. The magnetic recording head system of claim 1, wherein the microelectromechanical switch disconnects the transducing read element from the drive circuit in the first state and connects the transducing read element to the drive circuit in the second state.

3. The magnetic recording head system of claim 2, wherein the first state is a passive state and the second state is an actuated state.

4. The magnetic recording head system of claim 1, wherein the microelectromechanical switch selectively shunts two opposite leads of the transducing read element to one another in the first state for protecting the transducing read element.

5. The magnetic recording head system of claim 1, wherein the microelectromechanical switch selectively shunts at least one lead of the transducing read element to a fixed potential in the first state for protecting the transducing read element.

6. The magnetic recording head system of claim 5, wherein the fixed potential is ground.

7. The magnetic recording head system of claim 1, wherein the transducing read element is positionable by a microactuator, and wherein the microelectromechanical switch is incorporated into the microactuator.

8. A method of protecting magnetic recording head system having a transducing read head against electrostatic discharge (ESD) and electrical overstress (EOS), comprising:

generating an electrical control signal having a first state when ESD and EOS protection is desired and having a second state when operation of the transducing read head is desired; and providing the electrical control signal to a microelectromechanical switch to protect the transducing read head in response to the first state of the electrical control signal and to operate the transducing read head in response to the second state of the electrical control signal.

9. The method of claim 8, wherein the microelectromechanical switch is in a passive state in response to the first state of the electrical control signal and is in an actuated state in response to the second state of the electrical control signal.

10. The method of claim 8, wherein the microelectromechanical switch disconnects the transducing read head from a drive circuit in response to the first state of the electrical control signal and connects the transducing read head to the drive circuit in response to the second state of the electrical control signal.

11. The method of claim 8, wherein the microelectromechanical switch selectively shunts two opposite leads of the transducing read head to one another in response to the first state of the electrical control signal.

12. The method of claim 8, wherein the microelectromechanical switch selectively shunts at least one lead of the transducing read head to a fixed potential to protect the transducing read head in response to the first state of the electrical control signal.

13. The method of claim 12, wherein the fixed potential is ground.

14. The method of claim 8, wherein the transducing read head is positionable by a microactuator, and wherein the microelectromechanical switch is incorporated into the microactuator.

15. A magnetic recording head system having protection against electrostatic discharge (ESD) and electrical overstress (EOS), comprising:

a transducing read element;

a drive circuit for connection to operate the transducing read element; and switching means for selectively protecting and operating the transducing read element in response to an electrical control signal.

16. The magnetic recording head system of claim 15, wherein the switching means disconnects the transducing read element from the drive circuit in response to a first state of the electrical control signal and connects the transducing read element to the drive circuit in a second state of the electrical control signal.

17. The magnetic recording head system of claim 15, wherein the switching means selectively connects two opposite leads of the transducing read element to one another to protect the transducing read element.

18. The magnetic recording head system of claim 15, wherein the switching means selectively connects the transducing read element to a fixed potential to protect the transducing read element.

19. The magnetic recording head system of claim 18, wherein the fixed potential is ground.

20. The magnetic recording head system of claim 15, wherein the transducing read element is positionable by a microactuator, and wherein the switching means is incorporated into the microactuator.

* * * * *